US011579789B2

(12) United States Patent
Paley et al.

(10) Patent No.: US 11,579,789 B2
(45) Date of Patent: Feb. 14, 2023

(54) TECHNIQUES FOR MANAGING CONTEXT INFORMATION FOR A STORAGE DEVICE

(71) Applicant: Apple Inc., Cupertino, CA (US)

(72) Inventors: Alexander Paley, San Jose, CA (US); Andrew W. Vogan, Austin, TX (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 15/721,081

(22) Filed: Sep. 29, 2017

(65) Prior Publication Data

US 2019/0102101 A1 Apr. 4, 2019

(51) Int. Cl.
*G06F 3/06* (2006.01)
*G06F 13/28* (2006.01)

(52) U.S. Cl.
CPC ........... *G06F 3/0647* (2013.01); *G06F 3/064* (2013.01); *G06F 3/065* (2013.01); *G06F 3/068* (2013.01); *G06F 3/0613* (2013.01); *G06F 3/0619* (2013.01); *G06F 3/0689* (2013.01); *G06F 13/28* (2013.01); *G06F 2213/28* (2013.01)

(58) Field of Classification Search
CPC ...... G06F 3/0647; G06F 3/0613; G06F 3/064; G06F 3/068; G06F 13/28; G06F 2213/28
See application file for complete search history.

(56) References Cited

U.S. PATENT DOCUMENTS

| 9,037,820 | B2 | 5/2015 | Ratn et al. | |
|---|---|---|---|---|
| 9,158,779 | B2* | 10/2015 | Sudhakar | G06F 17/30067 |
| 9,460,177 | B1* | 10/2016 | Pawar | G06F 17/30227 |
| 2009/0113121 | A1* | 4/2009 | Lee | G06F 12/0246 711/103 |
| 2009/0327589 | A1* | 12/2009 | Moshayedi | G06F 11/1441 711/103 |
| 2010/0241806 | A1* | 9/2010 | Kawano | G06F 11/1441 711/118 |
| 2013/0339576 | A1* | 12/2013 | Liu | G06F 12/0246 711/103 |
| 2014/0006683 | A1* | 1/2014 | Ratn | G06F 11/1446 711/102 |
| 2014/0095767 | A1 | 4/2014 | Trika et al. | |
| 2016/0283401 | A1* | 9/2016 | Virajamangala | G06F 1/30 |
| 2017/0242584 | A1* | 8/2017 | Zhang | G06F 3/0688 |
| 2017/0337001 | A1* | 11/2017 | Lee | G06F 3/0619 |

(Continued)

*Primary Examiner* — Andrew J Cheong
(74) *Attorney, Agent, or Firm* — Dickinson Wright RLLP

(57) ABSTRACT

Disclosed herein are techniques for managing context information for data stored within a non-volatile memory of a computing device. According to some embodiments, the method can include (1) loading, into a volatile memory of the computing device, the context information from the non-volatile memory, where the context information is separated into a plurality of silos, (2) writing transactions into a log stored within the non-volatile memory, and (3) each time a condition is satisfied: (i) identifying a next silo of the plurality of silos to be written into the non-volatile memory, (ii) updating the next silo to reflect the transactions that apply to the next silo, and (iii) writing the next silo into the non-volatile memory. In turn, when an inadvertent shutdown of the computing device occurs, the silos of which the context information is comprised can be sequentially accessed and restored in an efficient manner.

20 Claims, 15 Drawing Sheets

(56) References Cited

U.S. PATENT DOCUMENTS

| | | | |
|---|---|---|---|
| 2018/0024919 A1* | 1/2018 | Geml | G06F 3/061 |
| | | | 711/103 |
| 2018/0089076 A1* | 3/2018 | Li | G06F 3/0616 |
| 2020/0089580 A1* | 3/2020 | Paley | G06F 11/1008 |

* cited by examiner

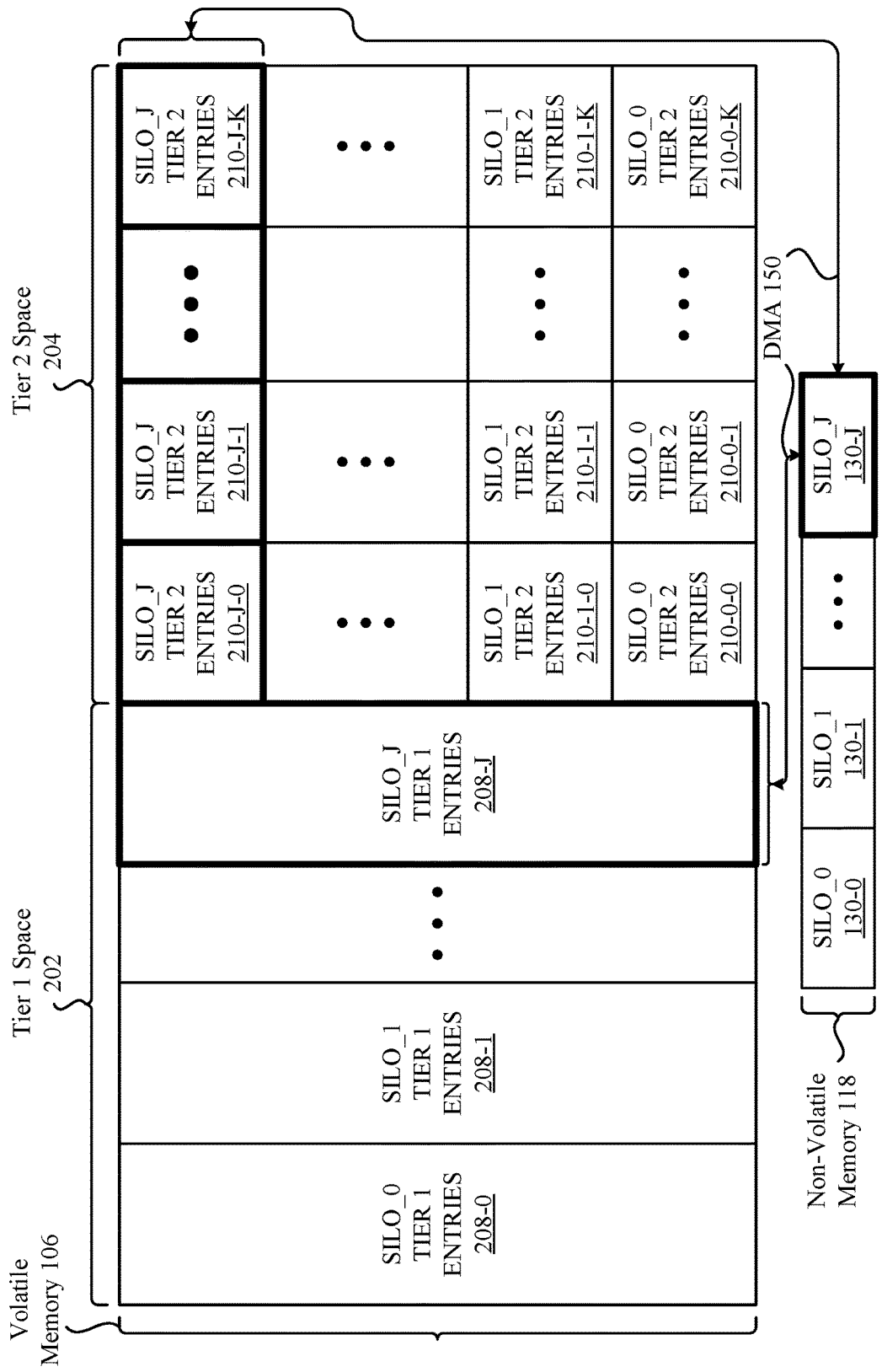

TECHNIQUES FOR MANAGING CONTEXT INFORMATION FOR A STORAGE DEVICE

FIELD

The described embodiments set forth techniques for managing context information for a non-volatile memory (e.g., a solid-state drive (SSD) of a computing device). In particular, the techniques involve segmenting the context information to increase the granularity by which it is transmitted between volatile and non-volatile memories, which can substantially enhance operational efficiency.

BACKGROUND

Solid state drives (SSDs) are a type of storage device that share a similar footprint with (and provide similar functionality as) traditional magnetic-based hard disk drives (HDDs). Notably, standard SSDs—which utilize "flash" memory—can provide various advantages over standard HDDs, such as considerably faster Input/Output (I/O) performance. For example, average I/O latency speeds provided by SSDs typically outperform those of HDDs because the I/O latency speeds of SSDs are less-affected when data is fragmented across the memory sectors of SSDs. This occurs because HDDs include a read head component that must be relocated each time data is read/written, which produces a latency bottleneck as the average contiguity of written data is reduced over time. Moreover, when fragmentation occurs within HDDs, it becomes necessary to perform resource-expensive defragmentation operations to improve or restore performance. In contrast, SSDs, which are not bridled by read head components, can preserve I/O performance even as data fragmentation levels increase. SSDs also provide the benefit of increased impact tolerance (as there are no moving parts), and, in general, virtually limitless form factor potential. These advantages—combined with the increased availability of SSDs at consumer-affordable prices—make SSDs a preferable choice for mobile devices such as laptops, tablets, and smart phones.

Despite the foregoing benefits provided by SSDs, some drawbacks remain that have yet to be addressed. In particular, for a given SSD, the size of the organizational data for managing data stored by the SSD—referred to herein as "context information"—scales directly with the amount of data managed by the SSD. This presents a problem given that the overall storage capacities of SSDs are only increasing with time, thereby leading to increased size requirements for the context information. For example, large-sized context information for a given SSD can lead to performance bottlenecks with regard to both (i) writing the context information (e.g., from a volatile memory) into the SSD, and (ii) restoring the context information when an inadvertent shutdown renders the context information out-of-date. Consequently, there exists a need for an improved technique for managing context information for data stored on SSDs to ensure that acceptable performance metrics remain intact even as the size of the context information scales with the ever-increasing capacities of SSDs.

SUMMARY

The described embodiments set forth techniques for managing context information for a non-volatile memory (e.g., a solid-state drive (SSD) of a computing device). In particular, the techniques involve partitioning the context information into a collection of "silos" that increase the granularity by which the context information is transferred between volatile and non-volatile memories. In this manner, periodic saves of the context information—as well as restorations of the context information in response to inadvertent shutdowns—can be performed more efficiently.

Accordingly, one embodiment sets forth a method for managing context information for data stored within a non-volatile memory of a computing device. According to some embodiments, the method includes the initial steps of (1) loading, into a volatile memory of the computing device, the context information from the non-volatile memory, where the context information is separated into a plurality of silos, and (2) writing transactions into a log stored within the non-volatile memory (e.g., transactions generated by the computing device). Additionally, the method includes performing additional steps each time a particular condition is satisfied, e.g., whenever a threshold number of transactions are processed by the computing device and written into the log. In particular, the additional steps include (3) identifying a next silo of the plurality of silos to be written into the non-volatile memory (i.e., relative to a last-written silo), (4) updating the next silo to reflect the transactions that apply to the next silo, and (5) writing the next silo into the non-volatile memory.

Another embodiment sets forth a method for restoring context information when an inadvertent shutdown of a computing device occurs. According to some embodiments, the method can include the steps of (1) identifying the context information within a non-volatile memory of the computing device (e.g., an SSD of the computing device), where the context information is separated into a plurality of silos, and (2) accessing a log stored within the non-volatile memory, where the log reflects a collection of transactions issued by the computing device. Additionally, the method includes performing the following steps for each silo of the plurality of silos: (3) loading the silo into the volatile memory, and (4) in response to identifying, within the log, that at least one transaction (i) applies to the silo, and (ii) occurred after a last write of the silo into the non-volatile memory: updating the silo to reflect the at least one transaction.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIGS. 2A-2C illustrate conceptual diagrams of example scenarios in which different silos can be transmitted, in a unified manner, between a volatile memory and a non-volatile memory by way of direct memory access (DMA), according to some embodiments.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments disclosed herein set forth techniques for managing context information for data stored within a non-volatile memory (e.g., a solid-state storage device (SSD)) managed by a computing device. In particular, the techniques involve partitioning the context information into a collection of "silos" in order to increase the granularity by which the context information is transmitted between a volatile memory (e.g., a random-access memory (RAM)) of the computing device and the non-volatile memory of the computing device. For example, direct memory access (DMA) can be utilized to sequentially write different ones of the silos from the volatile memory into the non-volatile memory, which substantially reduces latency in comparison to writing the context information in its entirety. Moreover, when an inadvertent shutdown of the computing device occurs—and the context information is not up-to-date within the non-volatile memory—the silos of which the context information is comprised can be sequentially accessed/ restored (e.g., based on logged transactional information), which further reduces latency in comparison to restoring the context information in its entirety.

Figure 1:
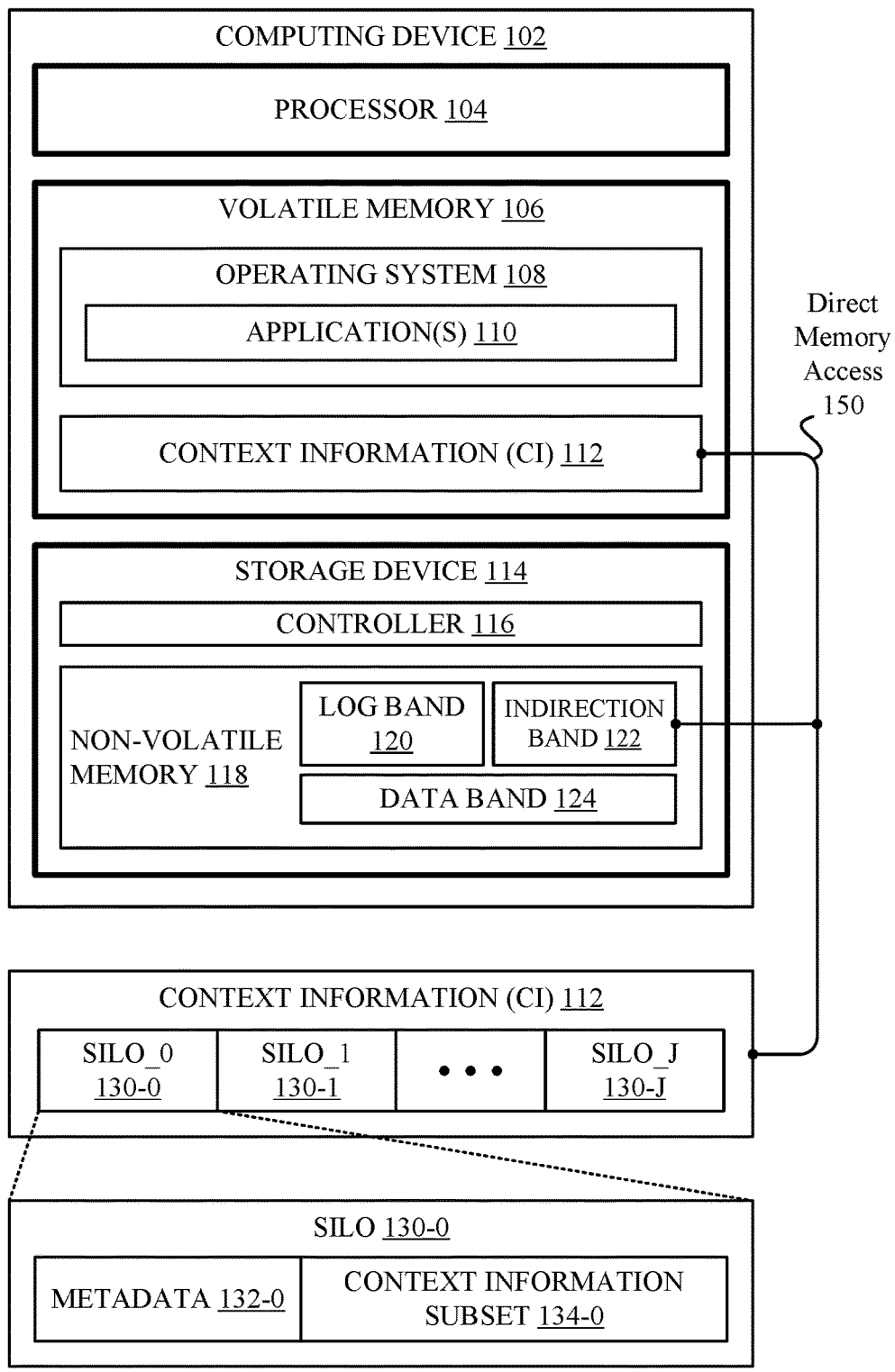
FIG. 1 illustrates a block diagram of different components of a system that is configured to implement the various techniques described herein, according to some embodiments.

FIG. 1 illustrates a block diagram 100 of a computing device 102—e.g., a smart phone, a tablet, a laptop, a desktop, a server, etc.—that is configured implement the various techniques described herein. As shown in FIG. 1, the computing device 102 can include a processor 104 that, in conjunction with a volatile memory 106 (e.g., a dynamic random access memory (DRAM)) and a storage device 114 (e.g., a solid-state drive (SSD)), enables different software entities to execute on the computing device 102. For example, the processor 104 can be configured to load, from the storage device 114 into the volatile memory 106, various components for an operating system (OS) 108. In turn, the OS 108 can enable the computing device 102 to provide a variety of useful functions, e.g., loading/executing various applications 110 (e.g., user applications). It should be understood that the various hardware components of the computing device 102 illustrated in FIG. 1 are presented at a high level in the interest of simplification, and that a more detailed breakdown is provided below in conjunction with FIG. 8.

According to some embodiments, and as shown in FIG. 1, the storage device 114 can include a controller 116 that is configured to orchestrate the overall operation of the storage device 114. For example, the controller 116 can be configured to process input/output (I/O) requests— referred to herein as "transactions"—issued by the OS 108/applications 110 to the storage device 114. According to some embodiments, the controller 116 can include a parity engine for establishing various parity information for the data stored by the storage device 114 to improve overall recovery scenarios. It is noted that the controller 116 can include additional entities that enable the implementation of the various techniques described herein without departing from the scope of this disclosure. It is further noted that these entities can be combined or split into additional entities without departing from the scope of this disclosure. It is additionally noted that the various entities described herein can be implemented using software-based or hardware-based approaches without departing from the scope of this disclosure.

In any case, as shown in FIG. 1, the storage device 114 can include a non-volatile memory 118 (e.g., flash memory) that is composed of a collection of dies. According to some embodiments, different "bands" can be established within the non-volatile memory 118, where each band spans the collection of dies. It is noted that one or more of the dies can be reserved by the storage device 114—e.g., for overprovisioning-based techniques—without departing from the scope of this disclosure, such that a given band can span a subset of the dies that are available within the non-volatile memory 118. In this regard, the overall "width" of a band can be defined by the number of dies that the band spans. Continuing with this notion, the overall "height" of the band can be defined by a number of "stripes" into which the band is separated. Additionally, and according to some embodiments, each stripe within the band can be separated into a collection of pages, where each page is disposed on a different die of the non-volatile memory 118. For example, when a given band spans five different dies—and is composed of five different stripes—a total of twenty-five (25) pages are included in the band, where each column of pages is disposed on the same die. In this manner, the data within a given band can be separated across the non-volatile memory 118 in a manner that enables redundancy-based protection to be established without significantly impacting the overall performance of the storage device 114.

As shown in FIG. 1, the aforementioned bands managed by the storage device 114 can include a log band 120, an indirection band 122, and a data band 124. According to some embodiments, transactional information associated with the indirection band 122/*data* band 124—e.g., details associated with I/O requests processed by the controller 116—can be written into the log band 120. As described in greater detail herein, this transactional information can be utilized to restore the content of the indirection band 122 when an inadvertent shutdown of the computing device 102 renders at least a portion of the content out-of-date.

According to some embodiments, the content stored in the indirection band 122 can include context information 112 that serves as a mapping table for data that is stored within the data band 124. As shown in FIG. 1, the context information 112 can be transmitted between the volatile memory 106 and the non-volatile memory 118 using direct memory access (DMA) 150. In particular, the DMA 150 can enable the processor 104 to play little or no role in the data transmissions between the volatile memory 106 and the non-volatile memory 118, which can improve efficiency. It is noted, however, that any technique can be utilized to transmit data between the volatile memory 106 and the non-volatile memory 118 without departing from the scope of this disclosure. In any case, as shown in FIG. 1, the context information 112 can be segmented into a collection of silos 130, which, as described in greater detail herein, increases the granularity by which the context information 112 can be transmitted between the volatile memory 106 and the non-volatile memory 118. According to some embodiments, and as shown in FIG. 1, each silo 130 can include metadata 132 and a context information subset 134. According to some embodiments, the metadata 132 for a given silo 130 can include descriptive information about the silo 130, e.g., an index of the silo 130 (relative to the other silos 130), a size of the silo 130, and so on. Additionally, the context information subset 134 for a given silo 130 can include a respective portion of the context information 112 to which the silo 130 corresponds.

According to some embodiments, and as described in greater detail herein, the context information 112 can be organized into a hierarchy that includes first and second depth levels. In particular, the first depth level can correspond to a collection of first-tier entries, while the second depth level can correspond to a collection of second-tier entries. According to some embodiments, the first and second-tier entries can store data in accordance with different encoding formats that coincide with the manner in which the non-volatile memory 118 is partitioned into different sectors. For example, when each sector represents a 4 KB sector of memory, each first-tier entry can correspond to a contiguous collection of two hundred fifty-six (256) sectors. In this regard, the value of a given first-tier entry can indicate whether the first-tier entry (1) directly refers to a physical location (e.g., an address of a starting sector) within the non-volatile memory 118, or (2) directly refers (e.g., via a pointer) to one or more second-tier entries. According to some embodiments, when condition (1) is met, it is implied that all (e.g., the two-hundred fifty-six (256)) sectors associated with the first-tier entry are contiguously written, which can provide a compression ratio of 1/256. More specifically, this compression ratio can be achieved because the first-tier entry stores a pointer to a first sector of the two hundred fifty-six (256) sectors associated with the first-tier entry, where no second-tier entries are required. Alternatively, when condition (2) is met, information included in the first-tier entry indicates (i) one or more second-tier entries that are associated with the first-tier entry, as well as (ii) how the information in the one or more second-tier entries should be interpreted. Using this approach, each second-tier entry can refer to one or more sectors, thereby enabling data to be disparately stored across the sectors of the non-volatile memory 118. A more detailed description of the first-tier entries and second-tier entries is provided below in conjunction with FIGS. 3-4.

Accordingly, FIG. 1 provides high-level overview of the manner in which the computing device 102 can be configured to implement the techniques described herein. A more detailed explanation of these techniques will now be provided below in conjunction with FIGS. 2A-2C, 3-4, 5A-5F, and 6-8.

Figure 2A:
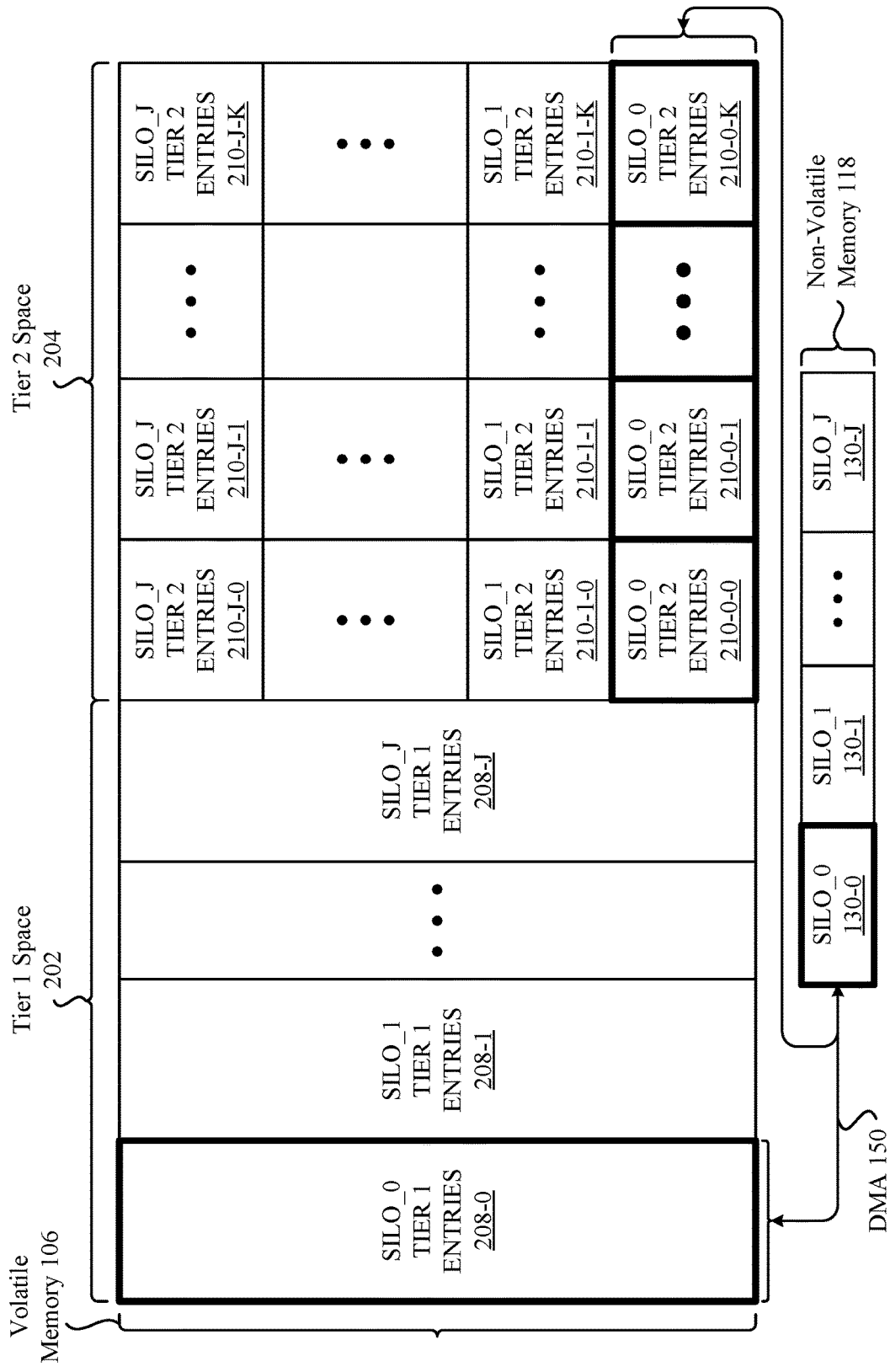
Figure 2B:
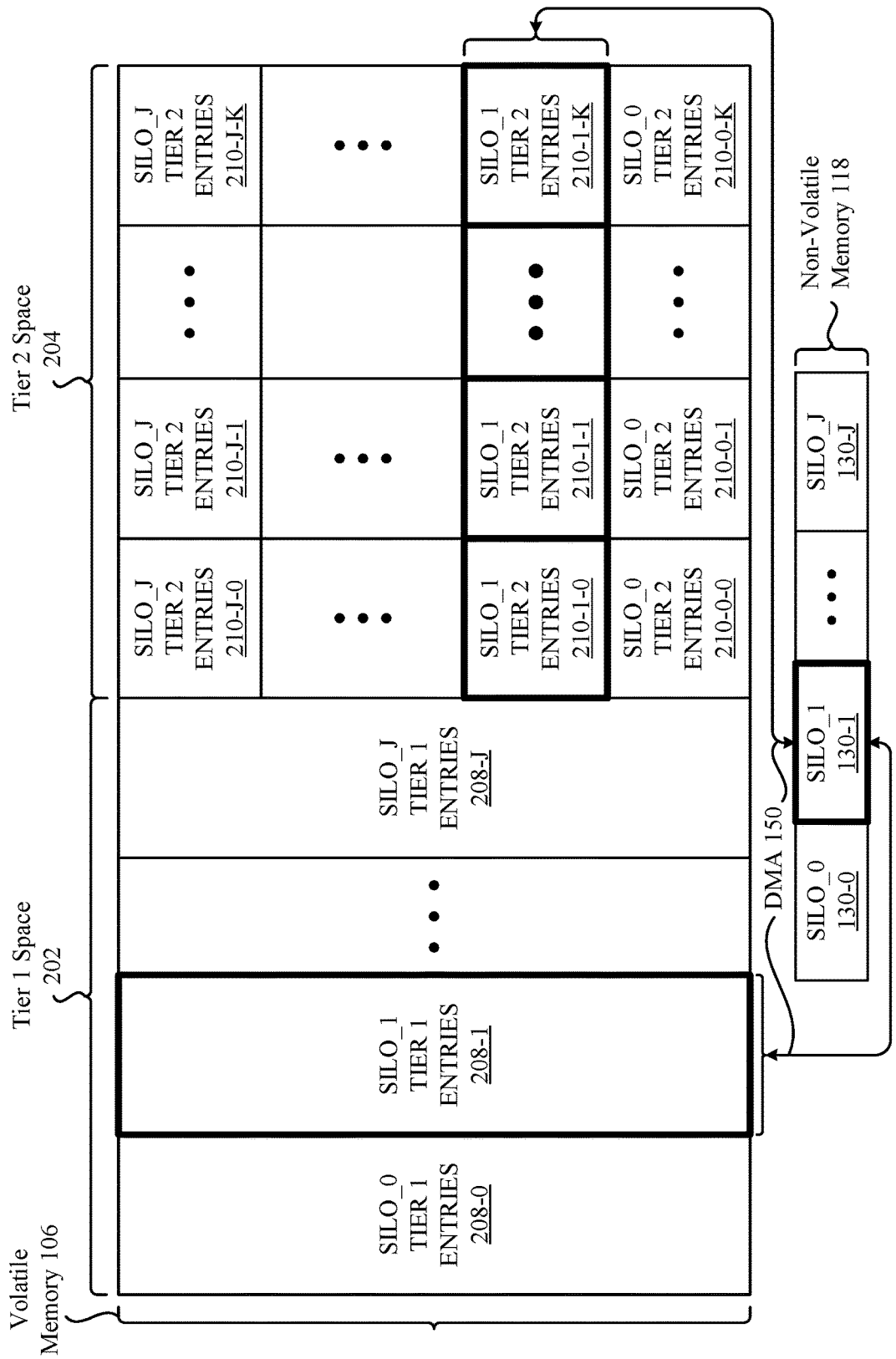

FIGS. 2A-2C illustrate conceptual diagrams of example scenarios in which different silos 130 can be transmitted, in a unified manner, between the volatile memory 106 and the non-volatile memory 118 by way of direct memory access 150, according to some embodiments. In particular, FIGS. 2A-2C illustrate that the context information subset 134 of a given silo 130—i.e., the first and second-tier entries that correspond to the silo 130—can be separately-stored from one another, yet remain capable of being transmitted between the volatile memory 106 and the non-volatile memory 118 in a unified manner. In other words, the techniques set forth herein enable the context information subset 134 of the silo 130 to be transmitted between the volatile memory 106 and the non-volatile memory 118 in the form of a snapshot-like image despite representing only a portion of the context information 112.

According to some embodiments, and as shown in FIG. 2A, a Tier 1 space 202 can be configured to store the different first-tier entries that correspond to the silos 130. In particular, the Tier 1 space 202 can be configured to represent a span of logical base addresses (LBAs), where the first-tier entries of each silo 130 correspond to a respective portion of the LBAs. For example, when the context information 112 is separated into thirty-two (32) different silos 130, each silo 130 can correspond to a respective 1/32 of the LBAs. In this regard, the Tier 1 space 202 can be fixed in size, whereas a Tier 2 space 204 can be dynamically expanded/contracted to accommodate second-tier entries as they are established/removed over time. Notably, it is important to ensure that the context information subset 134 for a given silo 130—which includes first and second-tier entries— can continue to be transmitted in a unified operation even as the Tier 2 space 204 fluctuates over time. To achieve this result, the embodiments can involve expanding the Tier 2 space 204 for all silos 130 even when only a single silo 130 is seeking to store additional second-tier entries (e.g., that cannot fit within existing Tier 2 space 204). For example, as indicated in FIG. 2A, adding a new column into the Tier 2 space 204 effectively expands the Tier 2 space 204 for all of the silos 130. Similarly, when a particular column in the Tier 2 space 204 is no longer needed—e.g., when all second-tier entries for all of the silos 130 are eliminated (e.g., through data deletions, defragmentation operations, etc.)—the column can be removed from the Tier 2 space 204.

In any case, in FIG. 2A, a first example can involve transmitting the silo 130-0—specifically, the context information subset 134-0 of the silo 130-0—between the volatile memory 106 and the non-volatile memory 118 using direct memory access 150. In particular, the first example can involve transmitting, in a unified manner, (1) the first-tier entries associated with the silo 130-0—illustrated in FIG. 2A as Silo_0 Tier 1 entries 208-0—and (2) the second-tier entries associated with the silo 130-0—illustrated in FIG. 2A as Silo_0 Tier 2 entries 210-0. According to some embodiments, the overall layout of the context information subset 134 (i.e., Silo_0 Tier 1 entries 208-0/Silo_0 Tier 2 entries 210-0) can be maintained when transmitted between the volatile memory 106 and the non-volatile memory 118 such that little operational overhead is required. For example, when written from the volatile memory 106 into the non-volatile memory 118, the context information subset 134-0 (of the silo 130-0) can be written into a corresponding area of the context information 112 in the indirection band 122 without requiring a reorganization/reformatting of the context information subset 134-0. Conversely, when read from the non-volatile memory 118 into the volatile memory 106, the context information subset 134-0 can be written into an available area of the volatile memory 106 (e.g., allocated for the context information 112) without requiring a reorganization/reformatting of the context information subset 134-0. In this manner, the silos 130 can be transmitted between the volatile memory 106 and the non-volatile memory 118 in a unified/snapshot-like manner, thereby substantially enhancing efficiency. Moreover, the direct memory access 150 techniques described herein can enable both the volatile memory 106 and the non-volatile memory 118 to directly-transmit the context information subsets 134 of the silos 130 between one another without requiring intensive involvement of the processor 104, thereby further enhancing operational efficiency.

Additionally, FIGS. 2B-2C provide further examples of silo 130 transfers between the volatile memory 106 and the non-volatile memory 118. In particular, FIGS. 2B-2C further-convey the notion that the context information subsets 134 of different silos 130 can be separately stored from one another, yet remain capable of being transmitted between the volatile memory 106 and the non-volatile memory 118 in a unified manner. For example, FIG. 2B illustrates an additional example that involves transmitting the silo 130-1—specifically, the context information subset 134-1 of the silo 130-1—between the volatile memory 106 and the non-volatile memory 118 using direct memory access 150. Further, FIG. 2C illustrates another example that involves transmitting the silo 130-J—specifically, the context information subset 134-J of the silo 130-J—between the volatile memory 106 and the non-volatile memory 118 using direct memory access 150.

Accordingly, FIGS. 2A-2C illustrate conceptual diagrams of example scenarios in which different silos 130 can be transmitted, in a unified manner, between the volatile memory 106 and the non-volatile memory 118 by way of direct memory access 150, according to some embodiments. It is noted that direct memory access 150 is not a requirement of the embodiments set forth herein, and that any approach can be utilized when transferring the silos 130 between the volatile memory 106 and the non-volatile memory 118.

Figure 3:
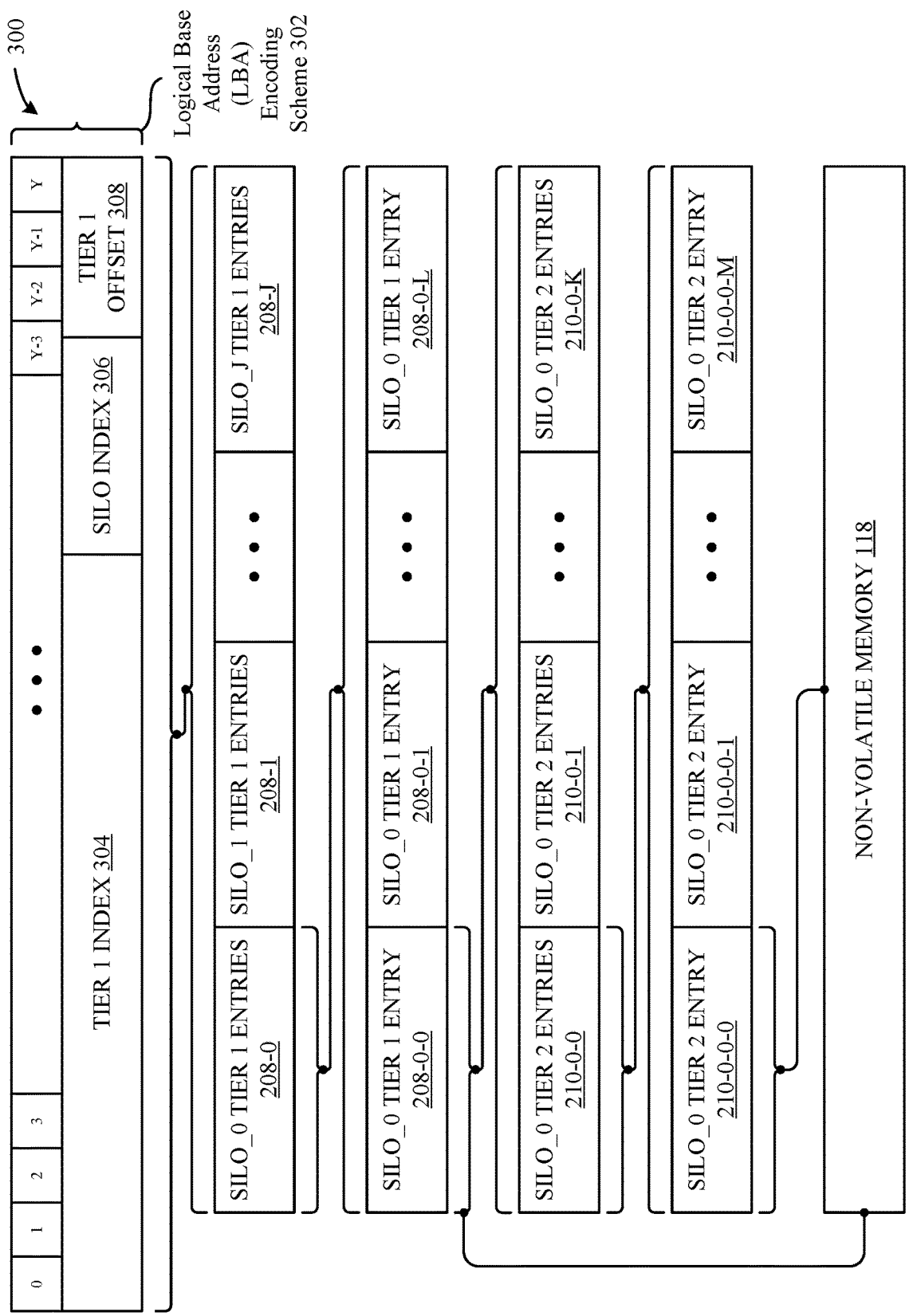
FIG. 3 sets forth a conceptual diagram of the manner in which data stored in non-volatile memory can be accessed through logical base addresses (LBAs) using the indirection techniques described herein, according to some embodiments.

FIG. 3 sets forth a conceptual diagram 300 of the manner in which data stored in non-volatile memory 118 (e.g., in the data band 124) can be accessed through logical base addresses (LBAs) using the indirection techniques described herein, according to some embodiments. In particular, and as shown in FIG. 3, an example LBA encoding scheme 302 can include a Tier 1 index 304, a silo index 306, and a Tier 1 offset 308. It is noted that the number of bits allocated to each of the Tier 1 index 304, the silo index 306, and the Tier 1 offset 308 are not drawn to scale in FIG. 3, and that these values can be assigned any number of bits without departing from the scope of this disclosure. In any case, as shown in FIG. 3, the Tier 1 index 304/*silo* index 306 can collectively refer to a particular group of first-tier entries (e.g., Silo_0 Tier 1 entries 208-0) associated with a particular silo 130, and the Tier 1 offset 308 can refer to a particular first-tier entry within the particular group of first-tier entries (e.g., Silo_0 Tier 1 entry 208-0-0). As previously described herein, and as illustrated in FIG. 3, each first-tier entry can refer to a physical location (e.g., via an address of a starting sector) within the non-volatile memory 118. Alternatively, and as illustrated in FIG. 3, each first-tier entry can refer to at least one second-tier entry (e.g., the Silo_0 Tier 2 entry 210-0-0-0 within the Silo_0 Tier 2 entries 210-0-0), where each second-tier entry can refer to one or more sectors of the non-volatile memory 118.

It is noted that a more detailed breakdown of various indirection techniques that can be utilized by the embodiments set forth herein can be found in U.S. patent application Ser. No. 14/710,495, filed May 12, 2015, entitled "METHODS AND SYSTEM FOR MAINTAINING AN INDIRECTION SYSTEM FOR A MASS STORAGE DEVICE," the content of which is incorporated by reference herein in its entirety.

Figure 4:
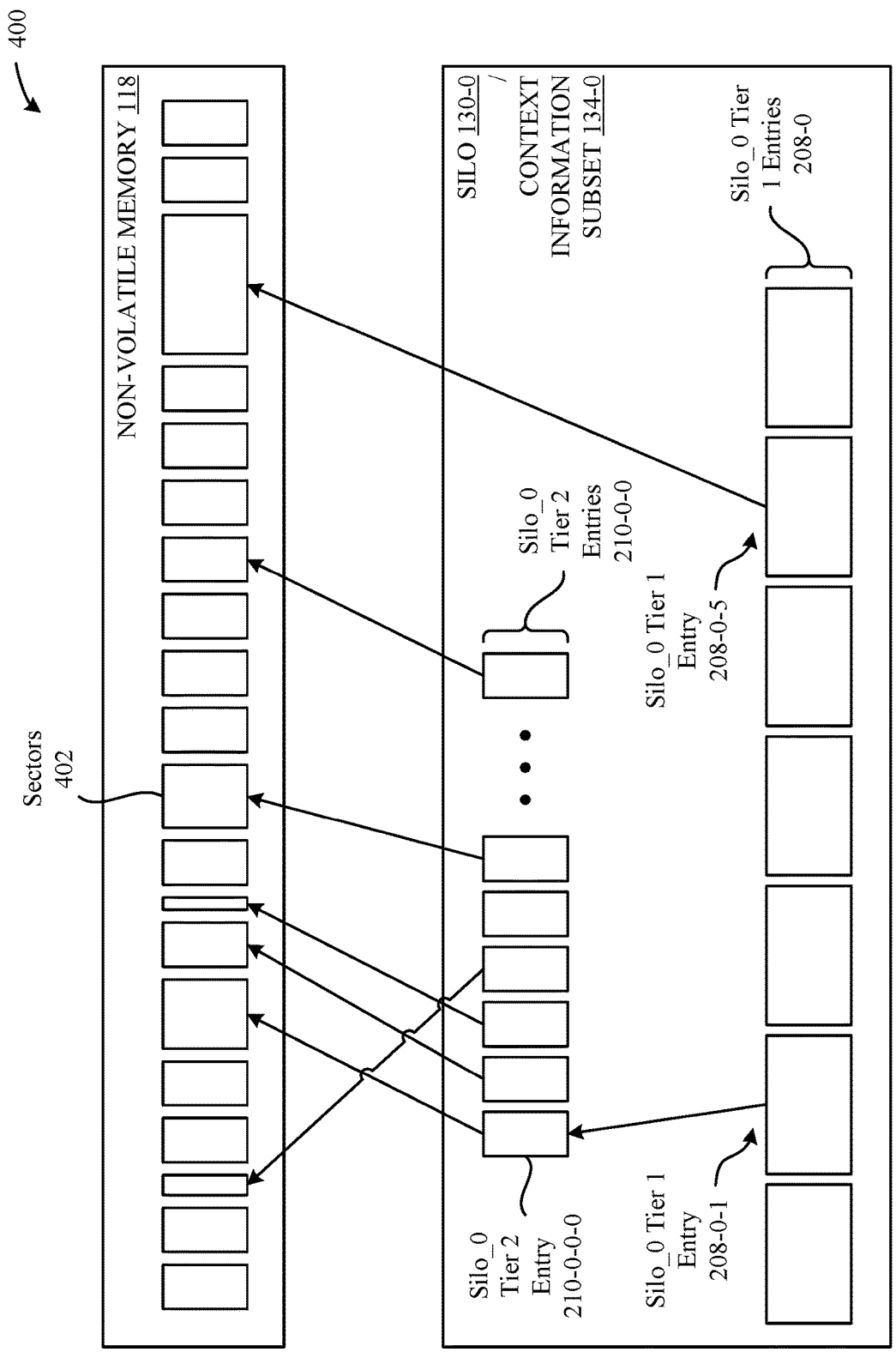
FIG. 4 illustrates a conceptual diagram of an example scenario that sets forth the manner in which first and second tier entries associated with a given silo can be used to reference data stored within a non-volatile memory, according to some embodiments.

To provide additional understanding of the indirection techniques described herein, FIG. 4 illustrates a conceptual diagram 400 of an example scenario that sets forth the manner in which first and second tier entries associated with a given silo 130—in particular, the silo 130-0—can be used to reference data stored within different sectors 402 of the non-volatile memory 118, according to some embodiments. In particular, and as shown in FIG. 4, several Silo_0 Tier 1 entries 208-0 associated with the silo 130-0 are depicted, where at least one of the Silo_0 Tier 1 entries 208-0—in particular, the Silo_0 Tier 1 entry 208-0-5—does not reference any Silo_0 Tier 2 entries 210-0-0. Instead, the Silo_0 Tier 1 entry 208-0-5 directly-references a particular sector 402 of the non-volatile memory 118. According to this example, the Silo_0 Tier 1 entry 208-0-5 can represent a pass-through first-tier entry that corresponds to a contiguous span of sectors 402 (as previously described herein). As also illustrated in FIG. 4, at least one of the Silo_0 Tier 1 entries 208-0—in particular, the Silo_0 Tier 1 entry 208-0-5—references at least one of the Silo_0 Tier 2 entries 210-0-0—in particular, the Silo_0 Tier 2 entry 210-0-0-0. In this regard, the Silo_0 Tier 2 entry 210-0-0-0—along with any other Silo_0 Tier 2 entries 210-0-0-0 that correspond to the Silo_0 Tier 1 entry 208-0-1—establish an indirect reference between the Silo_0 Tier 1 entry 208-0-1 and at least one sector 402 of the non-volatile memory 118. Accordingly, indirection techniques described herein enable each LBA to refer to content stored in the non-volatile memory 118 through only one or two levels of hierarchy, thereby providing a highly-efficient architecture on which the various techniques described herein can be implemented.

At this juncture, FIGS. 5A-5F provide conceptual diagrams of an example scenario in which the various techniques described herein—i.e., the silo-based partitions and indirection paradigms—can be utilized to improve the overall operational efficiency of the computing device 102. In particular, the example scenario illustrated in FIGS. 5A-5B involves efficiently writing four (4) of six (6) total silos 130 from the volatile memory 106 into the non-volatile memory 118 as transactions are received and carried out by the controller 116. Moreover, the example scenario illustrated in FIGS. 5C-5F involves the controller 116 (1) encountering an inadvertent shutdown that compromises the overall coherency of the six silos 130 in the non-volatile memory 118, and (2) efficiently carrying out a procedure to restore the coherency of the six silos 130. It is noted that the example scenario set forth in FIGS. 5A-5F involves six silos 130 in the interest of simplifying this disclosure, and that any number of silos 130 can be implemented without departing from the scope of this disclosure.

Figure 5A:
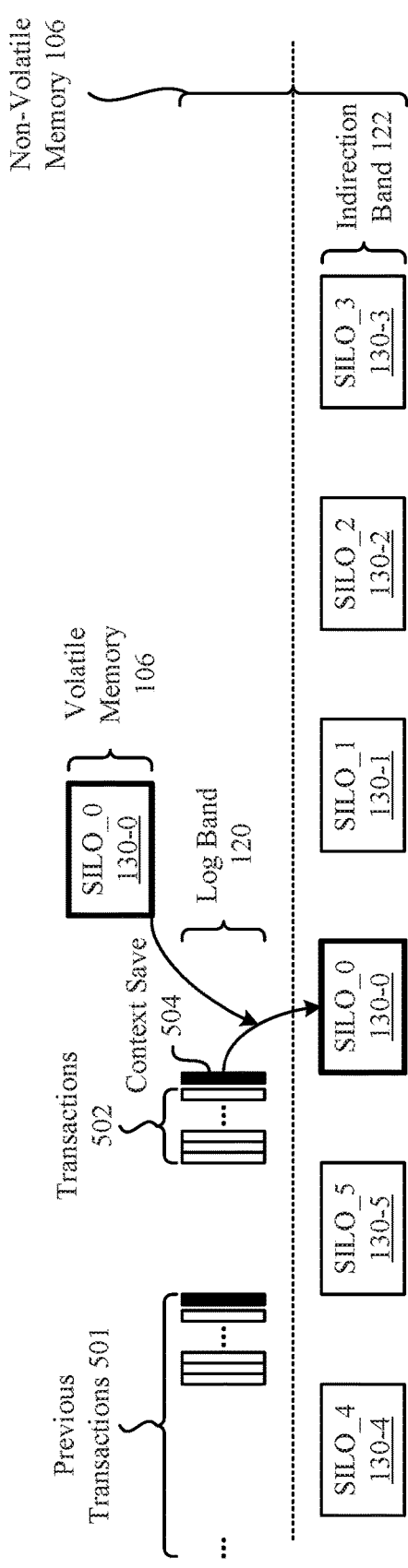
FIGS. 5A-5F provide conceptual diagrams of an example scenario in which the various techniques described herein— i.e., the silo-based partitions and indirection paradigms— can be utilized to improve the overall operational efficiency of a computing device.
Figure 5A:
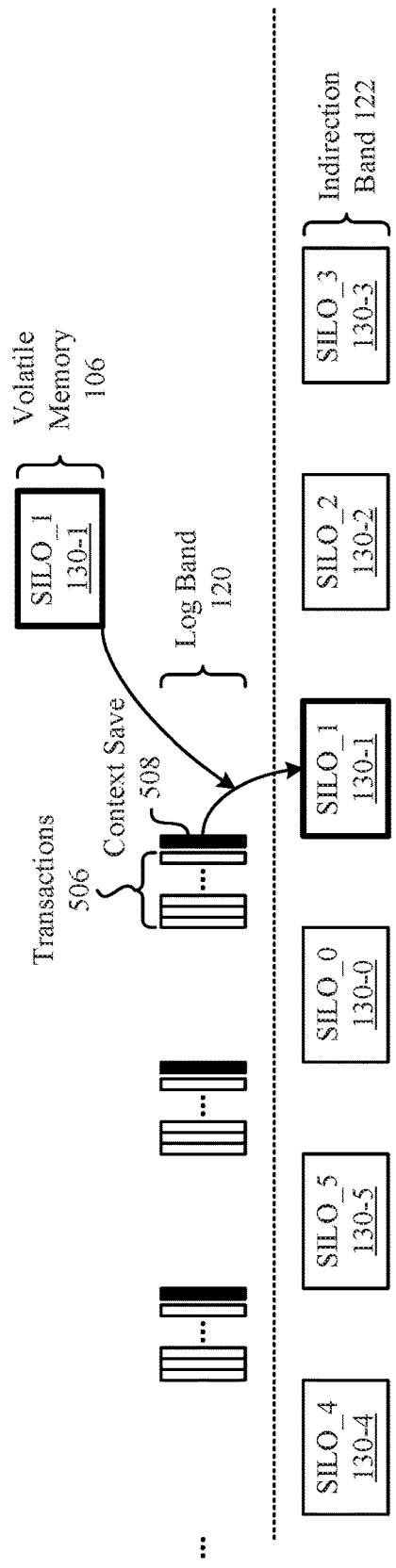

To provide a detailed understanding of the circular manner in which the silos 130 are written from the volatile memory 106 into the non-volatile memory 118, a first step in FIG. 5A occurs after previous transactions 501 are processed and cause the silo 130-5 to be the last-written silo 130 from the volatile memory 106 to the non-volatile memory 118. In this regard, the silo 130-4 is the last-written silo 130 relative to the silo 130-5, the silo 130-3 is the last-written silo 130 relative to silo 130-4, and so on. In this manner, a round-robin approach is utilized such that a successive silo 130 (relative to a previous silo 130) is written from the volatile memory 106 into the non-volatile memory 118 in accordance with different conditions being met, e.g., a threshold number of transactions being received, an amount of time lapsing, a particular functionality being executed (e.g., garbage collection, defragmentation, etc.), and the like.

Accordingly, and as shown in FIG. 5A, the first step involves the controller 116 receiving and processing a number of transactions 502. As previously noted herein, each transaction can represent one or more I/O requests that are directed toward the storage device 114. For example, a transaction 502 can involve writing, modifying, or removing data from the data band 124 within the non-volatile memory 118. It is noted that the foregoing example is not meant to be limiting, and that the transactions described herein encompass any form of I/O operation(s) directed toward the non-volatile memory 118 of the storage device 114. As shown in FIG. 5A, transactional information associated with each of the transactions 502 can be recorded within the log band 120 within the non-volatile memory 118. According to some embodiments, the transactional information can include pointers to the context information 112 stored within the indirection band 122. In particular, these pointers can enable an efficient restoration of the context information 112 to be carried out in response to inadvertent shutdowns of the computing device 102, the details of which are described below in conjunction with FIGS. 5C-5F. According to some embodiments, different log files can be managed within the log band 120, and can be used to store transactional information associated with the transactions as they are processed. Moreover, redundant copies of log file portions can be stored within the log band 120, thereby improving the efficacy of recovery procedures even when severe failure events take place. For example, for each log file portion stored on a first die of the non-volatile memory 118, a copy of the log file portion can be stored on a second (i.e., different) die of the non-volatile memory 118. In this manner, each log file portion can be recovered even when the first or the second die fails within the non-volatile memory 118.

As shown in FIG. 5A, the controller 116 can be configured to carry out a context save 504 in response to identifying that a threshold number of transactions have been processed. It is noted, however, that the controller 116 can be configured to carry out context saves in response to other conditions being satisfied. For example, the controller 116 can be configured to periodically carry out context saves regardless of the number of transactions that have been processed. In another example, the controller 116 can be configured to carry out context saves in response to different types of events being completed, e.g., garbage collection events, defragmentation events, and so on. It is noted that the foregoing examples are not meant to represent an exhaustive list, and that any number of conditions, associated with any aspects of the operation of the computing device 102, can cause the controller 116 to carry out context saves described herein.

In any case, as shown in FIG. 5A, the context save 504 can involve (1) updating the silo 130-0 to reflect the transactions 502, and (2) writing the silo 130-0 from the volatile memory 106 into the non-volatile memory 118. In particular, and as previously described above in conjunction with FIGS. 2A-2C, writing the silo 130-0 can involve transmitting all or a portion of the information associated with the silo 130-0, e.g., the metadata 132-0, the context information subset 134-0, etc., into a corresponding area within the context information 112 stored within the indirection band 122. According to some embodiments, the silo 130-0 can be placed into a locked state prior to the silo 130-0 being updated/written from the volatile memory 106 into the nonvolatile memory 118 to ensure that the state of the silo 130-0 is not inappropriately modified. Additionally, the context save 504 can involve writing information into the log band 120 to indicate whether the silo 130-0 was successfully written into the non-volatile memory 118. For example, when the silo 130-0 is successfully written from the volatile memory 106 to the nonvolatile memory 118, the controller 116 can generate a key that corresponds to the silo 130-0, and place the key into the log band 120. In this manner, the log band 120 can be parsed at a later time to identify the last-written silo 130 among the silos 130. As described below in greater detail in conjunction with FIGS. 5C-5F, the indication of the last-written silo 130 enables the recovery techniques described herein to be implemented in an efficient manner.

Figure 5B:
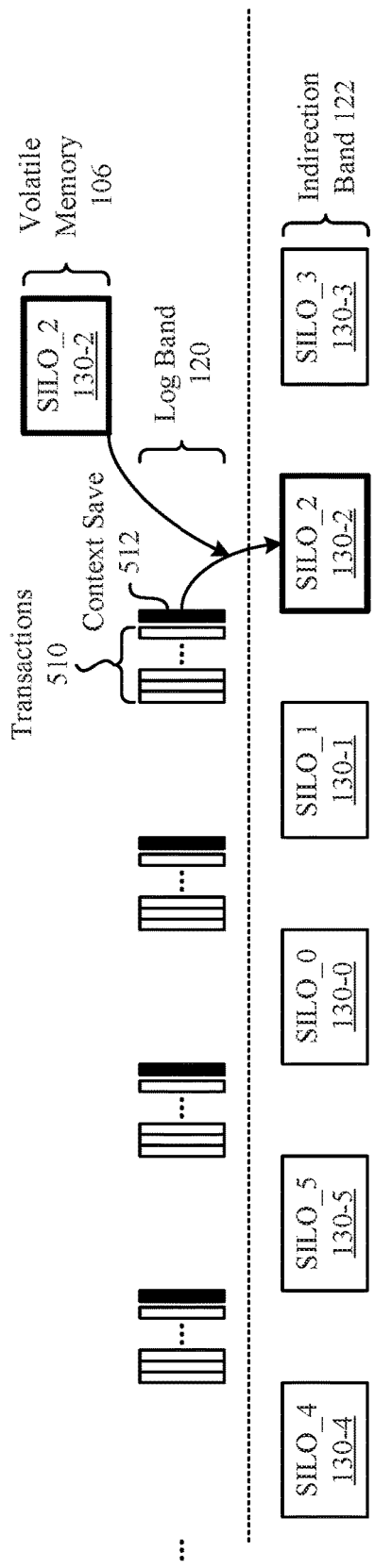
Figure 5B:
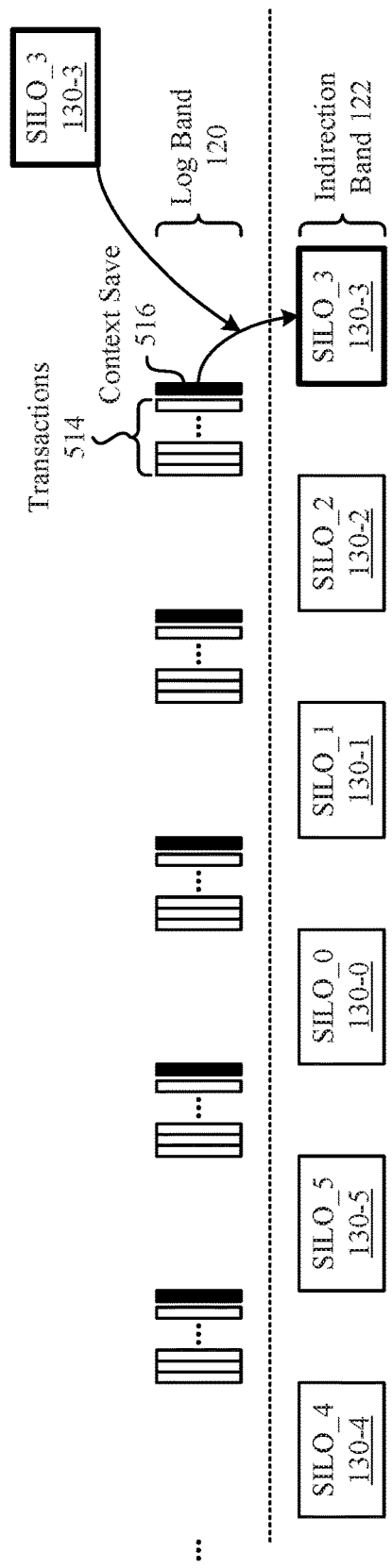

Additionally, the second step illustrated in FIG. 5A—as well as the third and fourth steps illustrated in FIG. 5B—provide additional understanding for the silo 130 write techniques set forth herein. For example, the second step in FIG. 5A involves (1) writing transactions 506 into the log band 120, and (2) in accordance with a context save 508, updating the silo 130-1/writing the silo 130-1 from the volatile memory 106 into the non-volatile memory 118. Additionally, the third step of FIG. 5B involves (1) writing transactions 510 into the log band 120, and (2) in accordance with a context save 512, updating the silo 130-2/writing the silo 130-2 from the volatile memory 106 into the non-volatile memory 118. Further, the fourth step of FIG. 5B involves (1) writing transactions 514 into the log band 120, and (2) in accordance with a context save 516, updating the silo 130-3/writing the silo 130-3 from the volatile memory 106 into the non-volatile memory 118.

Accordingly, the various steps illustrated in FIGS. 5A-5B provide a detailed understanding of the benefits that can be achieved through segmenting the context information 112 when writing the context information 112 from the volatile memory 106 into the non-volatile memory 118. As previously described herein, these benefits can also apply to recovery scenarios in which the context information 112 is rendered out-of-date and needs to be restored in accordance with the transaction information stored in the log band 120. For example, an inadvertent shutdown of the computing device 102 can cause a scenario in which (1) at least one transaction that affects a particular silo 130 has been written into the log band 120, and (2) the silo 130 has not been written from the volatile memory 106 into the non-volatile memory 118. In this scenario, the silo 130 stored within the non-volatile memory 118 is out-of-date, as the state of the silo 130 does not appropriately reflect the at least one transaction. Accordingly, it is necessary to restore the silo 130 to an up-to-date state (in accordance with the at least one transaction) to ensure that the storage device 114—and the computing device 102 as a whole—are operating correctly.

Figure 5C:
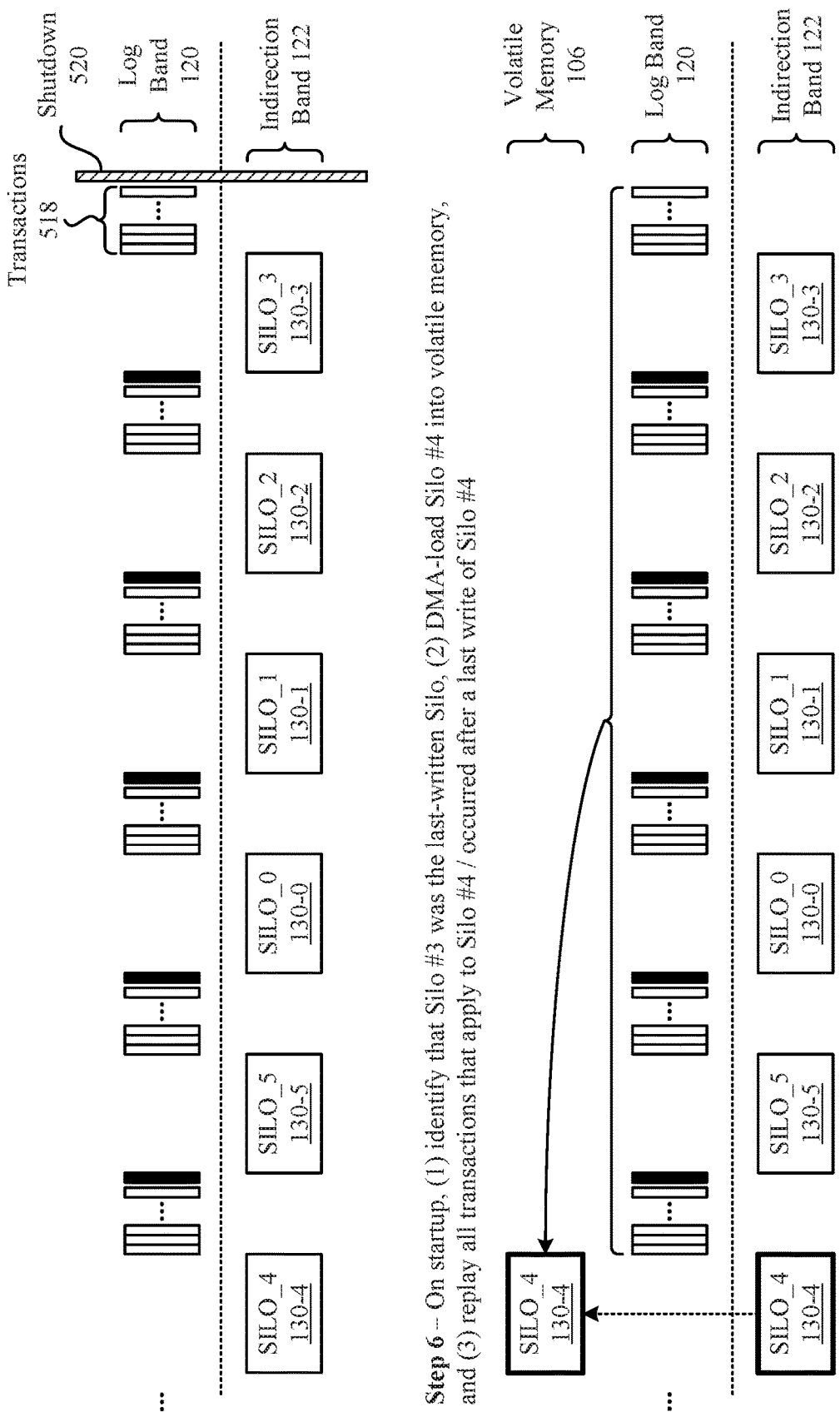

Accordingly, FIG. 5C continues the example scenario illustrated in FIGS. 5A-5B, and involves a fifth step in which an inadvertent shutdown 520 of the computing device 102 occurs (1) after transactions 518 are written into the log band 120, but (2) before the silo 130-4 is written from the volatile memory 106 into the non-volatile memory 118. In turn, a sixth step illustrated in FIG. 5C involves the controller 116 initializing a recovery procedure (e.g., during a boot, reboot, wakeup, etc., of the computing device 102) to restore the context information 112. In particular, and as shown in FIG. 5C, the sixth step involves the controller 116 identifying that the silo 130-3 was the last silo 130 that was written from the volatile memory 106 into the non-volatile memory 118. For example, as previously described above, the controller 116 can reference the log band 120—e.g., the transaction logs, the keys stored therein, etc.—to identify that the silo 130-3 was the last-written silo 130. In turn, to carry out the recovery procedure, the controller 116 can load the silo 130-4 into the volatile memory 106. In particular, the controller 116 loads the silo 130-4 because the silo 130-4 is the most out-of-date silo 130 relative to the other silos 130, with the assumption that the silos 130 are written in a sequential, circular, and repetitive fashion (e.g., as described in FIGS. 5A-5B). In this regard, it can be efficient to restore the silo 130-4 first, as it can be likely that the silo 130-4 will require the most updates relative to the other silos 130.

Accordingly, as shown in FIG. 5C—and after the silo 130-4 is loaded into the volatile memory 106—the controller 116 can identify, e.g., within the transaction information stored in the log band 120—any transactions that (1) apply to the silo 130-4, and (2) occurred after the silo 130-4 was last-written from the volatile memory 106 into the non-volatile memory 118. In turn, if the controller 116 identifies any transactions using the foregoing criteria, the controller 116 can "replay" the transactions against the silo 130-4—in particular, the context information subset 134-4 of the silo 130-4—in accordance with the transactions. This can involve, for example, updating first/second tier entries included in the context information subset 134-4 so that they reference the appropriate areas of the non-volatile memory 118 (in accordance with the transactions).

According to some embodiments, when the transactions have been effectively replayed, the silo 130-4 is in an up-to-date state, and the silo 130-4 can optionally be written from the volatile memory 106 into the non-volatile memory 118. Additionally, the transaction information stored in the log band 120 can be updated to reflect that the silo 130-4 has been successfully written. In this manner, if another inadvertent shutdown occurs during the recovery procedure, the same updates made to the silo 130-4 during the restoration of the sixth step of FIG. 5C will not need to be carried out again, thereby increasing efficiency. Alternatively, the silo 130-4 will be written from the volatile memory 106 into the non-volatile memory 118 in due course, e.g., when the computing device 102 resumes normal operation after the recovery procedure is completed.

Figure 5D:
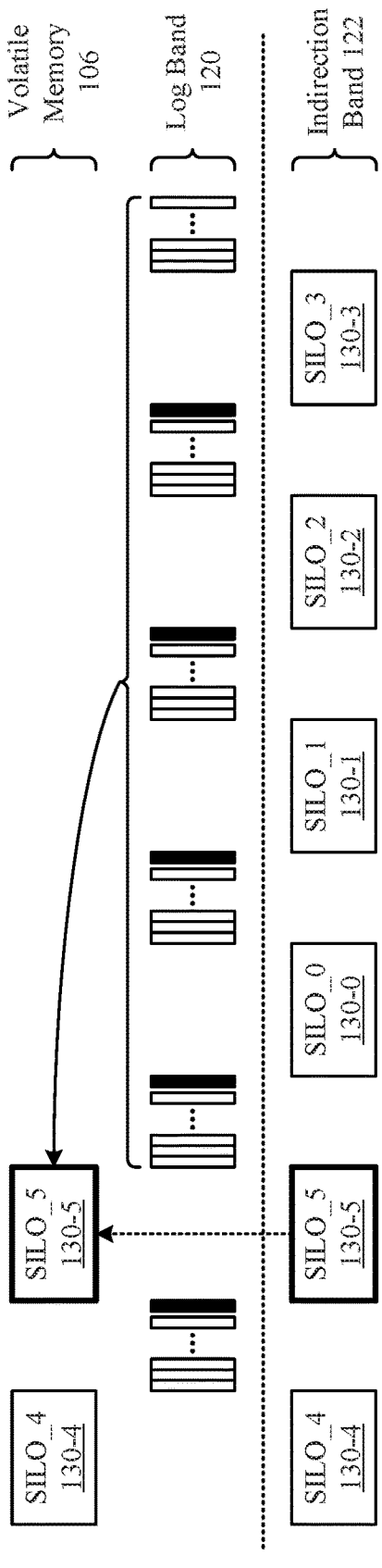
Figure 5D:
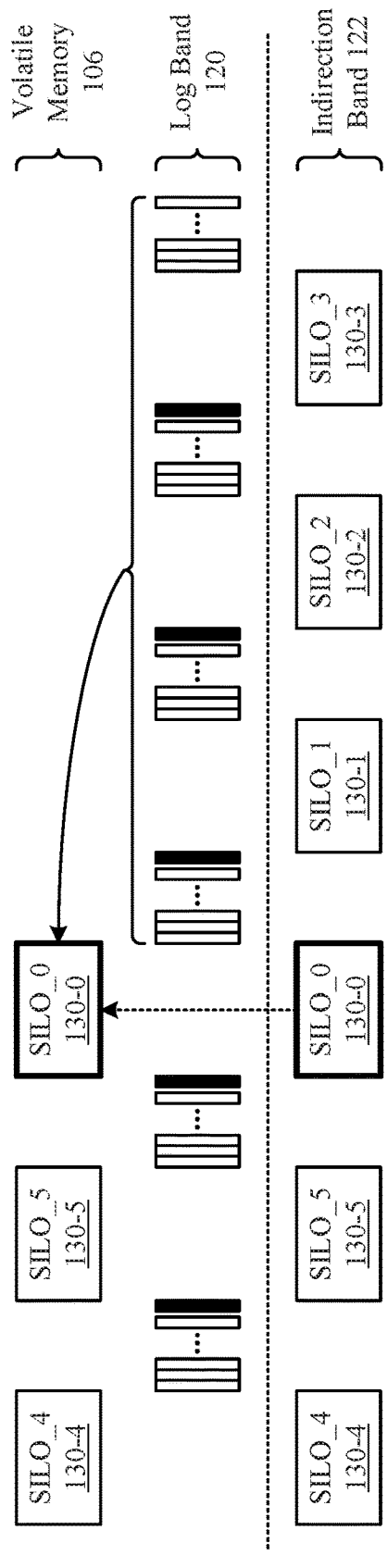
Figure 5E:
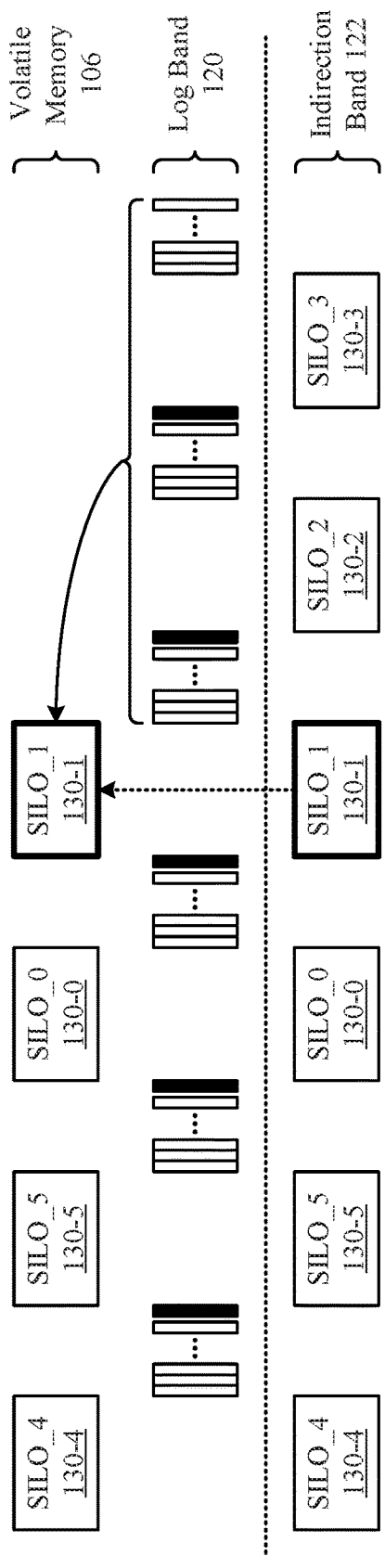
Figure 5E:
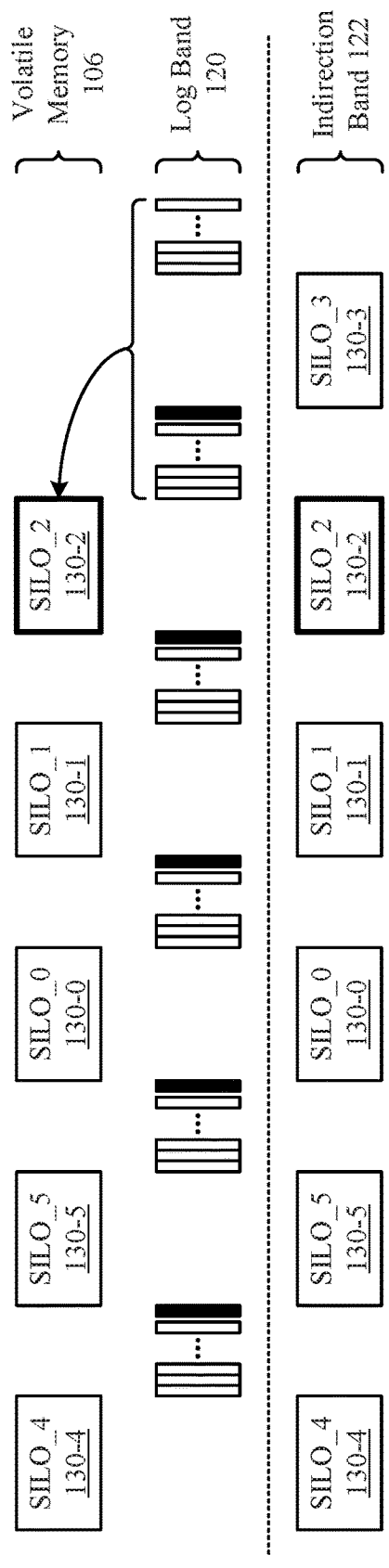
Figure 5F:
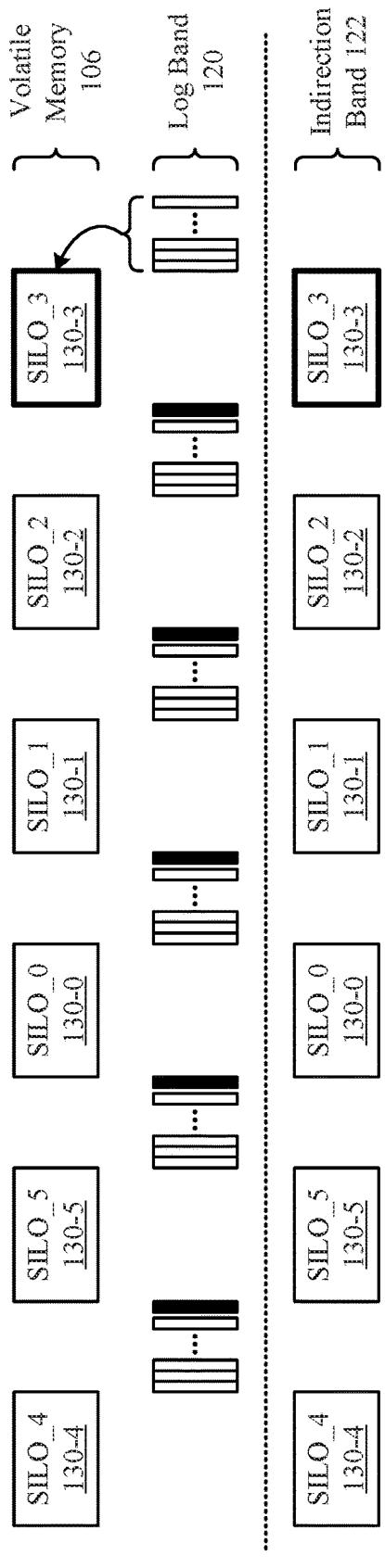
Figure 5F:
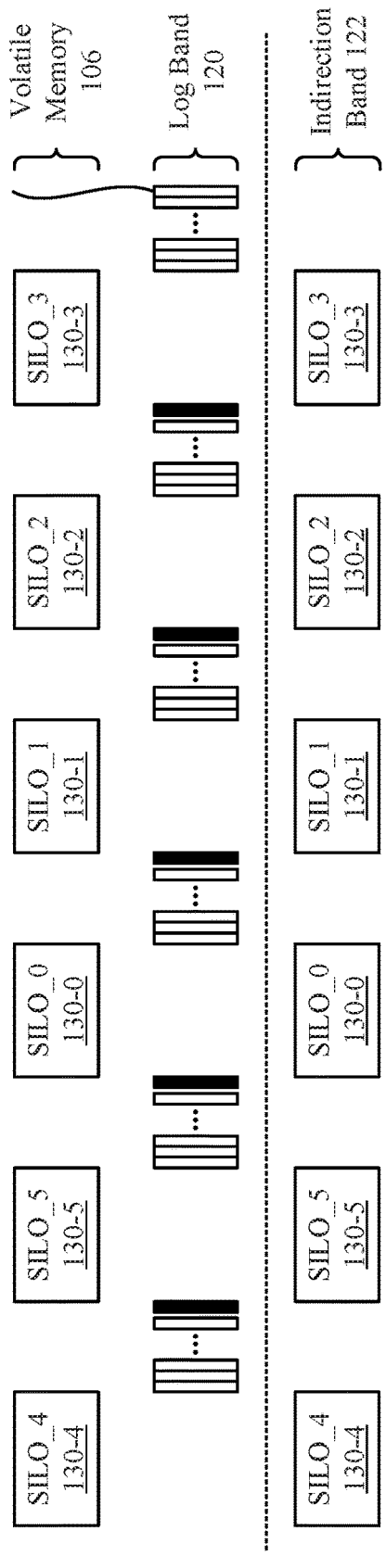

In any case, at this juncture, it is noted that the transactions that occurred after the silo 130-3 was written from the volatile memory 106 into the non-volatile memory 118 can potentially apply to one or more of the remaining five silos 130-5, 130-0, 130-1, 130-2, and 130-3. Accordingly, FIGS. 5D-5F illustrate steps seven through eleven of the recovery procedure, which involve restoring each of the remaining five silos 130-5, 130-0, 130-1, 130-2, and 130-3. For example, step seven illustrated in FIG. 5D illustrates a recovery procedure for the silo 130-5 that is carried out by the controller 116. Additionally, step eight illustrated in FIG. 5D illustrates a recovery procedure for the silo 130-0 that is carried out by the controller 116. Additionally, step nine illustrated in FIG. 5E illustrates a recovery procedure for the silo 130-1 that is carried out by the controller 116. Additionally, step ten illustrated in FIG. 5E illustrates a recovery procedure for the silo 130-2 that is carried out by the controller 116. Additionally, step eleven illustrated in FIG. 5F illustrates a recovery procedure for the silo 130-3 that is carried out by the controller 116. In turn, at step twelve illustrated in FIG. 5F, each of the six silos 130 have been properly restored, whereupon the computing device 102/storage device 114 can enter back into a normal operating mode and process new transactions 550.

Accordingly, FIGS. 5A-5F provide conceptual diagrams of an example scenario in which the various techniques described herein—i.e., the silo-based partitions and indirection paradigms—can be utilized to improve the overall operational efficiency of the computing device 102. To provide further context, FIGS. 6-7 illustrate method diagrams that can be carried out to implement the various techniques described herein, which will now be described below in greater detail.

Figure 6:
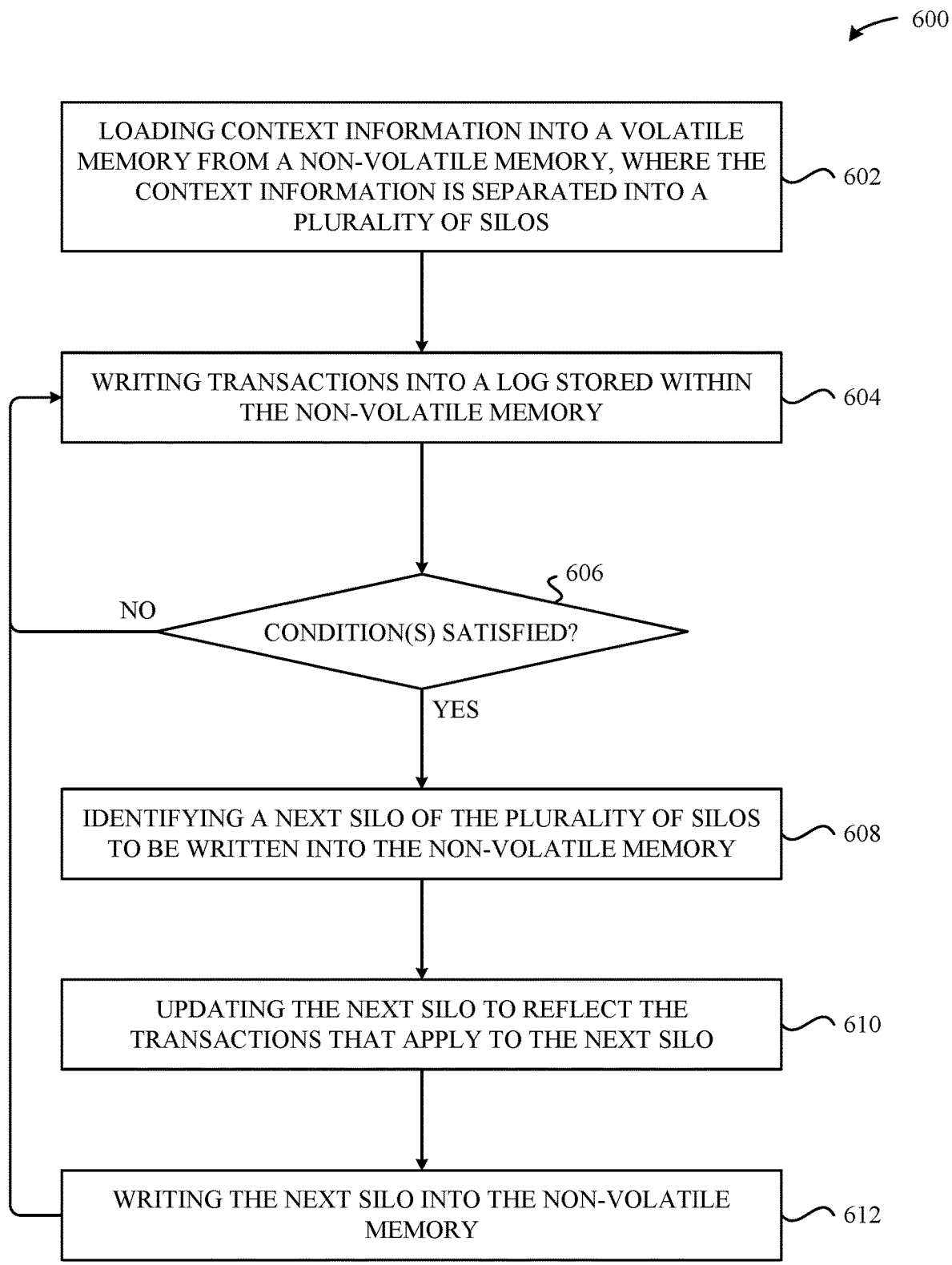
FIG. 6 illustrates a method for managing context information for data stored within a non-volatile memory of a computing device, according to some embodiments.

FIG. 6 illustrates a method 600 for managing context information for data stored within a non-volatile memory of a computing device, according to some embodiments. As shown in FIG. 6, the method 600 begins at step 602, and involves loading context information into a volatile memory (of the computing device) from the non-volatile memory, where the context information is separated into a plurality of silos (e.g., as described above in conjunction with FIGS. 2A-2C). Step 604 involves writing transactions into a log stored within the non-volatile memory (e.g., as described above in conjunction with FIGS. 5A-5B). Step 606 involves determining whether at least one condition is satisfied (e.g., the conditions described above in conjunction with FIG. 5A). If, at step 606, it is determined that condition is satisfied, then the method 600 proceeds to step 608. Otherwise, the method 600 proceeds back to step 604, where transactions are received/written into the log (until the at least one condition is satisfied).

Step 608 involves identifying a next silo of the plurality of silos to be written into the non-volatile memory (e.g., as described above in conjunction with FIGS. 5A-5B). Step 610 involves updating the next silo to reflect the transactions that apply to the next silo (e.g., as described above in conjunction with FIGS. 5A-5B). Step 612 involves writing the next silo into the non-volatile memory (e.g., as described above in conjunction with FIGS. 5A-5B). In turn, the method can return to step 604, such that the silos are updated in a round-robin fashion in accordance with the transactions that are processed.

Figure 7:
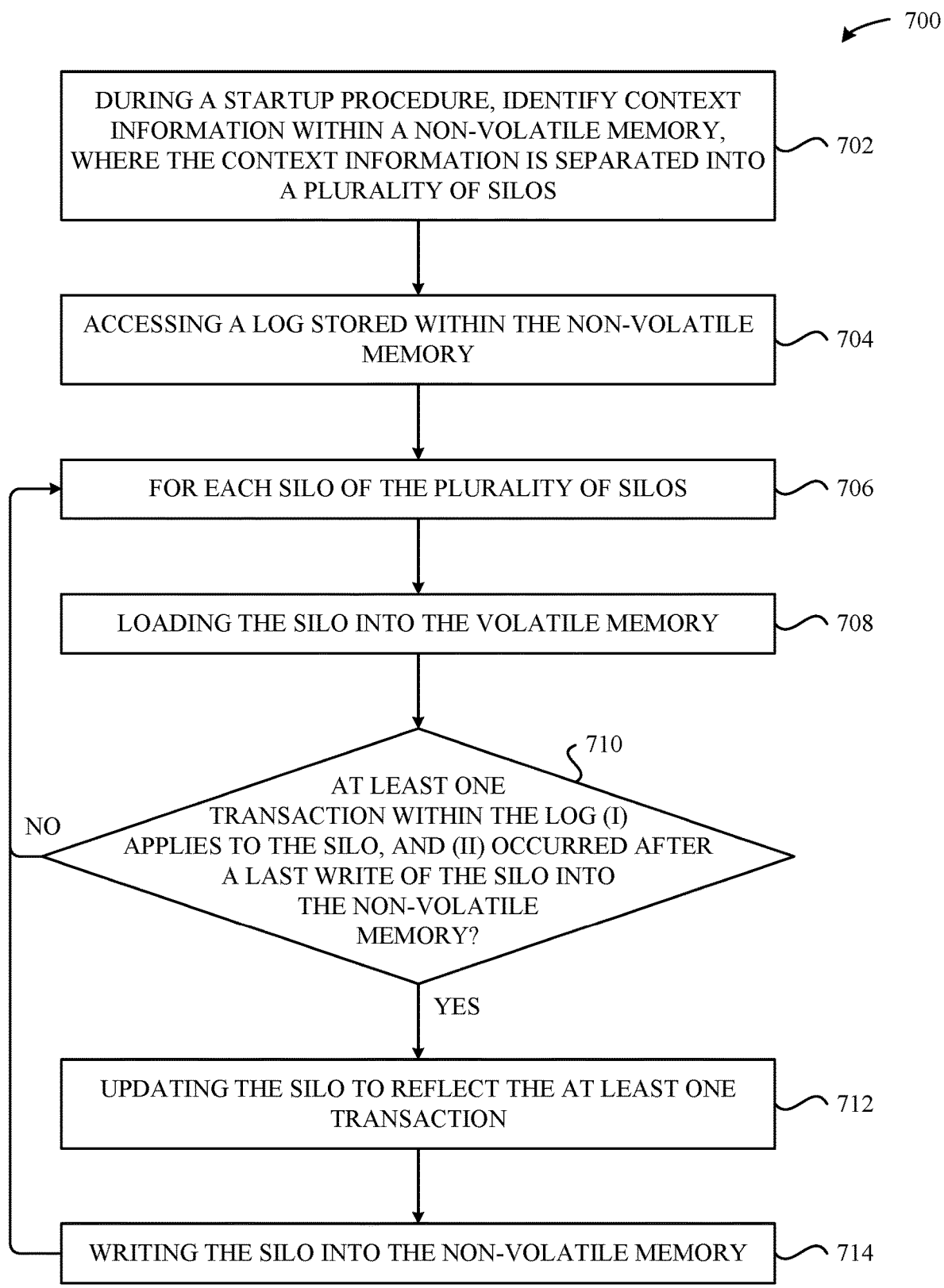
FIG. 7 illustrates a method for restoring context information when an inadvertent shutdown of a computing device occurs, according to some embodiments.

FIG. 7 illustrates a method 700 for restoring context information when an inadvertent shutdown of a computing device occurs, according to some embodiments. As shown in FIG. 7, the method 700 begins at step 702, and involves identifying, during a startup procedure (e.g., a boot, a reboot, a wakeup, etc.), context information within a non-volatile memory, where the context information is separated into a plurality of silos (e.g., as described above in conjunction with FIGS. 2A-2C). Step 704 involves accessing a log stored within the non-volatile memory (e.g., as described above in conjunction with FIGS. 5C-5F). Step 706 involves carrying out steps 708-714 for each silo of the plurality of silos. In particular, step 708 involves loading the silo into the volatile memory (e.g., as described above in conjunction with FIGS. 5C-5F). In turn, step 710 involves determining whether at least one transaction in the log (i) applies to the silo, and (ii) occurred after a last write of the silo into the non-volatile memory (e.g., as described above in conjunction with FIGS. 5C-5F). If, at step 710, it is determined that at least one transaction in the log (i) applies to the silo, and (ii) occurred after a last write of the silo into the non-volatile memory, then the method 700 proceeds to step 712. Otherwise, the method 700 proceeds back to step 706, which involves processing a next silo (if any) of the plurality of silos, or the method 700 ends. Step 712 involves updating the silo to reflect the at least one transaction (e.g., as described above in conjunction with FIGS. 5C-5F). At step 714, the controller 116 writes the silo into the non-volatile memory (e.g., as described above in conjunction with FIGS. 5C-5F). In turn, the method can proceed back to step 706, which involves processing a next silo (if any) of the plurality of silos, or ending the method 700.

It is noted that this disclosure primarily involves the controller 116 carrying out the various techniques described herein for the purpose of unified language and simplification. However, it is noted that other entities can be configured to carry out these techniques without departing from this disclosure. For example, other software components (e.g., the OS 108, applications 110, firmware(s), etc.) executing on the computing device 102 can be configured to carry out all or a portion of the techniques described herein without departing from the scope of this disclosure. Moreover, other hardware components included in the computing device 102 can be configured to carry out all or a portion of the techniques described herein without departing from the scope of this disclosure. Further, all or a portion of the techniques described herein can be offloaded to another computing device without departing from the scope of this disclosure.

Figure 8:
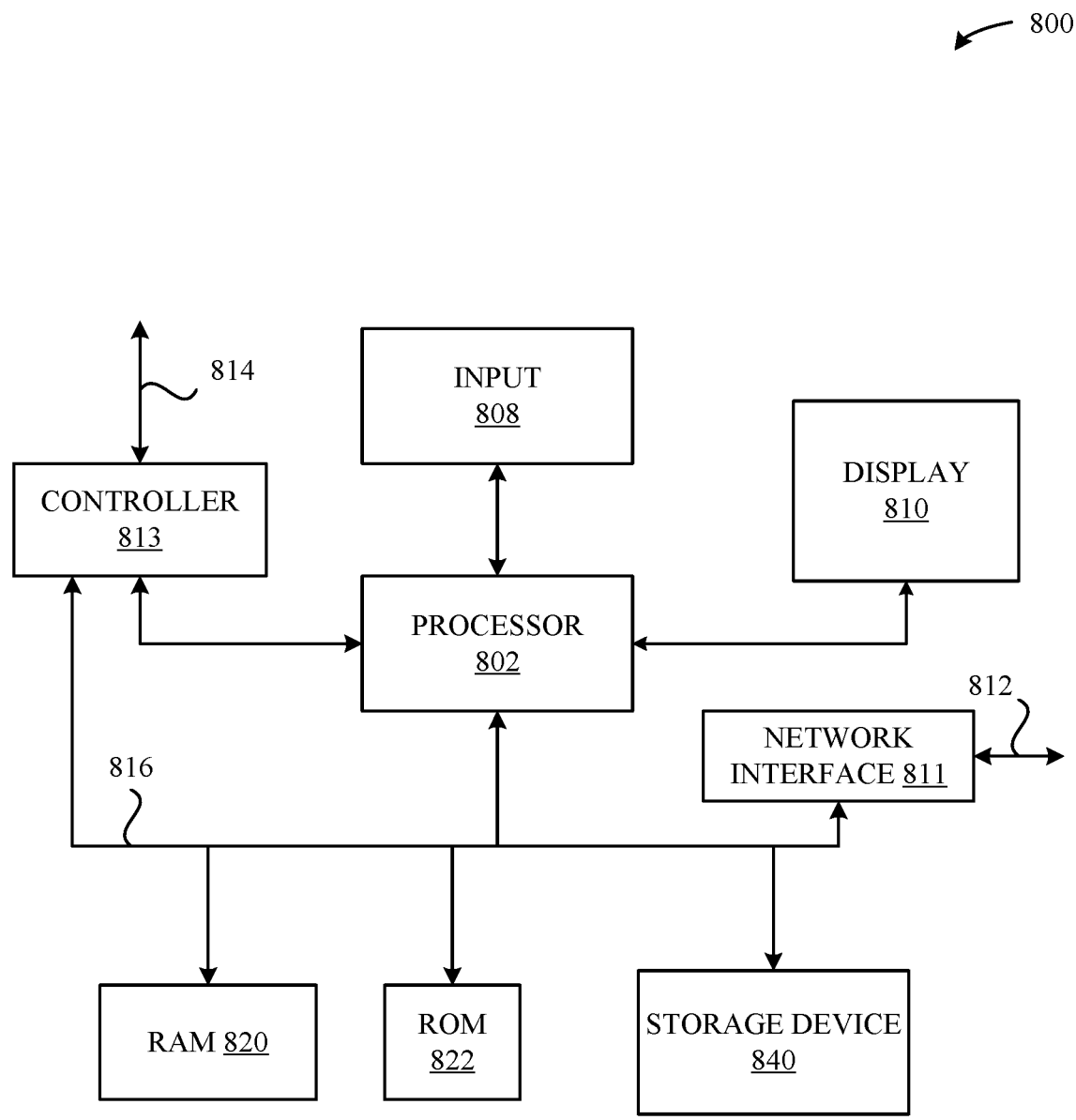
FIG. 8 illustrates a detailed view of a computing device that can be used to implement the various components described herein, according to some embodiments.

FIG. 8 illustrates a detailed view of a computing device 800 that can be used to implement the various components described herein, according to some embodiments. In particular, the detailed view illustrates various components that can be included in the computing device 102 illustrated in FIG. 1. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 (screen display) that can be controlled by the processor 802 to display information to the user. A data bus 816 can facilitate data transfer between at least a storage device 840, the processor 802, and a controller 813. The controller 813 can be used to interface with and control different equipment through and equipment control bus 814. The computing device 800 can also include a network/bus interface 811 that couples to a data link 812. In the case of a wireless connection, the network/bus interface 811 can include a wireless transceiver.

The computing device 800 also includes a storage device 840, which can comprise a single disk or a plurality of disks (e.g., SSDs), and includes a storage management module that manages one or more partitions within the storage device 840. In some embodiments, storage device 840 can include flash memory, semiconductor (solid state) memory or the like. The computing device 800 can also include a Random-Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

What is claimed is:

1. A method for managing context information for data stored within a non-volatile memory of a computing device, the method comprising, at the computing device:
   loading, from the non-volatile memory into a volatile memory of the computing device, the context information in its entirety, wherein:
     the non-volatile memory is associated with a logical base address (LBA) range,
     the context information, in its entirety, is segmented into a plurality of silos, and
     each silo of the plurality of silos corresponds to a respective and distinct contiguous range of the LBA range such that the plurality of silos, in their entirety, correspond to the LBA range;
   writing transactions into a transaction log stored within the non-volatile memory, wherein the transaction log is isolated from the context information; and
   each time a condition is satisfied to perform a context save:
     identifying a last silo of the plurality of silos that was updated and written to the non-volatile memory,
     identifying a next silo of the plurality of silos that is contiguous to the last silo,
     updating the next silo to reflect any transactions that apply to the next silo, and
     writing the next silo into the non-volatile memory, wherein the next silo is an only silo of the plurality of silos that is written in conjunction with the context save, such that the plurality of silos are written to the non-volatile memory in a round-robin manner.

2. The method of claim 1, wherein direct memory access (DMA) is utilized to write the plurality of silos into the non-volatile memory.

3. The method of claim 1, wherein:
   a number of the transactions is maintained,
   the condition is satisfied each time the number satisfies a particular threshold, and
   the number is reset each time the condition is satisfied.

4. The method of claim 1, wherein each silo of the plurality of silos includes:

metadata associated with the silo;
a first memory structure that includes a plurality of first-tier entries; and
a second memory structure that includes a plurality of second-tier entries.

5. The method of claim 4, wherein, for a given silo of the plurality of silos, each first-tier entry of the plurality of first-tier entries references (1) an area of memory within the non-volatile memory, or (2) at least one second-tier entry within the second memory structure.

6. The method of claim 5, wherein, for a given silo of the plurality of silos, each second-tier entry of the plurality of second-tier entries references an area of memory within the non-volatile memory.

7. The method of claim 4, wherein the first memory structure and the second memory structure are not contiguously stored within the volatile memory and/or the non-volatile memory.

8. The method of claim 1, wherein each silo of the plurality of silos is locked prior to updating the silo.

9. At least one non-transitory computer readable storage medium configured to store instructions that, when executed by at least one processor of a computing device, cause the computing device to manage context information for data stored within a non-volatile memory of the computing device, by carrying out steps that include:
loading, from the non-volatile memory into a volatile memory of the computing device, the context information in its entirety, wherein:
the non-volatile memory is associated with a logical base address (LBA) range,
the context information, in its entirety, is segmented into a plurality of silos, and
each silo of the plurality of silos corresponds to a respective and distinct contiguous range of the LBA range such that the plurality of silos, in their entirety, correspond to the LBA range;
writing transactions into a transaction log stored within the non-volatile memory, wherein the transaction log is isolated from the context information; and
each time a condition is satisfied to perform a context save:
identifying a last silo of the plurality of silos that was updated and written to the non-volatile memory,
identifying a next silo of the plurality of silos that is contiguous to the last silo,
updating the next silo to reflect any transactions that apply to the next silo, and
writing the next silo into the non-volatile memory, wherein the next silo is an only silo of the plurality of silos that is written in conjunction with the context save, such that the plurality of silos are written to the non-volatile memory in a round-robin manner.

10. The at least one non-transitory computer readable storage medium of claim 9, wherein:
a number of the transactions is maintained,
the condition is satisfied each time the number satisfies a particular threshold, and
the number is reset each time the condition is satisfied.

11. The at least one non-transitory computer readable storage medium of claim 9, wherein each silo of the plurality of silos includes:
metadata associated with the silo;
a first memory structure that includes a plurality of first-tier entries; and
a second memory structure that includes a plurality of second-tier entries.

12. The at least one non-transitory computer readable storage medium of claim 11, wherein, for a given silo of the plurality of silos, each first-tier entry of the plurality of first-tier entries references (1) an area of memory within the non-volatile memory, or (2) at least one second-tier entry within the second memory structure.

13. The at least one non-transitory computer readable storage medium of claim 12, wherein, for a given silo of the plurality of silos, each second-tier entry of the plurality of second-tier entries references an area of memory within the non-volatile memory.

14. A computing device configured to manage context information, comprising:
at least one non-volatile memory;
at least one volatile memory; and
at least one processor configured to:
load, from the at least one non-volatile memory into the at least one volatile memory of the computing device, the context information in its entirety, wherein:
the at least one non-volatile memory is associated with a logical base address (LBA) range,
the context information, in its entirety, is segmented into a plurality of silos, and
each silo of the plurality of silos corresponds to a respective and distinct contiguous range of the LBA range such that the plurality of silos, in their entirety, correspond to the LBA range;
write transactions into a transaction log stored within the at least one non-volatile memory, wherein the transaction log is isolated from the context information; and
each time a condition is satisfied to perform a context save:
identifying a last silo of the plurality of silos that was updated and written to the at least one non-volatile memory,
identifying a next silo of the plurality of silos that is contiguous to the last silo,
updating the next silo to reflect any transactions that apply to the next silo, and
writing the next silo into the at least one non-volatile memory, wherein the next silo is an only silo of the plurality of silos that is written in conjunction with the context save, such that the plurality of silos are written to the at least one non-volatile memory in a round-robin manner.

15. The computing device of claim 14, wherein direct memory access (DMA) is utilized to write the plurality of silos into the at least one non-volatile memory.

16. The computing device of claim 14, wherein:
a number of the transactions is maintained,
the condition is satisfied each time the number satisfies a particular threshold, and
the number is reset each time the condition is satisfied.

17. The computing device of claim 14, wherein each silo of the plurality of silos includes:
metadata associated with the silo;
a first memory structure that includes a plurality of first-tier entries; and
a second memory structure that includes a plurality of second-tier entries.

18. The computing device of claim 17, wherein, for a given silo of the plurality of silos, each first-tier entry of the plurality of first-tier entries references (1) an area of memory within the at least one non-volatile memory, or (2) at least one second-tier entry within the second memory structure.

19. The computing device of claim 18, wherein, for a given silo of the plurality of silos, each second-tier entry of the plurality of second-tier entries references an area of memory within the at least one non-volatile memory.

20. The computing device of claim 17, wherein the first memory structure and the second memory structure are not contiguously stored within the at least one volatile memory and/or the at least one non-volatile memory.

\* \* \* \* \*

UNITED STATES PATENT AND TRADEMARK OFFICE
CERTIFICATE OF CORRECTION

| | | |
|---|---|---|
| PATENT NO. | : 11,579,789 B2 | Page 1 of 1 |
| APPLICATION NO. | : 15/721081 | |
| DATED | : February 14, 2023 | |
| INVENTOR(S) | : Alexander Paley et al. | |

It is certified that error appears in the above-identified patent and that said Letters Patent is hereby corrected as shown below:

In the Specification

At Column 8, Line 43: "208-0—in particular, the Silo_0 Tier 1 entry 208-0-5—" should read -- 208-0—in particular, the Silo_0 Tier 1 entry 208-0-1— --.

Signed and Sealed this
Thirty-first Day of October, 2023

Katherine Kelly Vidal
*Director of the United States Patent and Trademark Office*